(12) United States Patent
Wu et al.

(10) Patent No.: US 11,461,626 B2
(45) Date of Patent: Oct. 4, 2022

(54) BRAIN-LIKE COMPUTING CHIP AND COMPUTING DEVICE

(71) Applicant: LYNXI TECHNOLOGIES CO., LTD., Beijing (CN)

(72) Inventors: Zhenzhi Wu, Beijing (CN); Guanrui Wang, Beijing (CN); Luping Shi, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/431,479

(22) PCT Filed: Jan. 15, 2020

(86) PCT No.: PCT/CN2020/072260
§ 371 (c)(1),
(2) Date: Aug. 17, 2021

(87) PCT Pub. No.: WO2020/173237
PCT Pub. Date: Sep. 3, 2020

(65) Prior Publication Data
US 2022/0138542 A1    May 5, 2022

(30) Foreign Application Priority Data

Feb. 25, 2019    (CN) .......................... 201910139378.2

(51) Int. Cl.
*G06N 3/063*    (2006.01)
*G06F 7/544*    (2006.01)

(52) U.S. Cl.
CPC ........... *G06N 3/063* (2013.01); *G06F 7/5443* (2013.01)

(58) Field of Classification Search
CPC .............................. G06N 3/063; G06F 7/5443
See application file for complete search history.

(56) References Cited

U.S. PATENT DOCUMENTS

| | | | |
|---|---|---|---|
| 5,237,210 A | * | 8/1993 | Castro .................... G06N 3/063 706/35 |
| 5,479,579 A | | 12/1995 | Duong et al. |

(Continued)

FOREIGN PATENT DOCUMENTS

| | | | |
|---|---|---|---|
| CN | 101567159 A | 10/2009 |
| CN | 104809498 A | 7/2015 |

(Continued)

OTHER PUBLICATIONS

WIPO, International Search Report dated Apr. 1, 2020.
(Continued)

*Primary Examiner* — Michael D. Yaary
(74) *Attorney, Agent, or Firm* — Li & Cai Intellectual Property (USA) Office

(57) ABSTRACT

The present disclosure provides a brain-like computing chip and a computing device. The brain-like computing chip includes is a many-core system composed of one or more functional cores, and data transmission is performed between the functional cores by means of a network-on-chip. The functional core includes at least one neuron processor configured to compute various neuron models, and at least one coprocessor coupled to the neuron processor and configured to perform an integral operation and/or a multiply-add-type operation; and the neuron processor is capable of calling the coprocessor to perform the multiply-add-type operation.

9 Claims, 2 Drawing Sheets

(56) References Cited

U.S. PATENT DOCUMENTS

| | | | |
|---|---|---|---|
| 8,504,503 B1 * | 8/2013 | Poon | G06N 3/049 706/33 |
| 2011/0029471 A1 | 2/2011 | Chakradhar et al. | |
| 2016/0210723 A1 | 7/2016 | Yang et al. | |
| 2018/0285727 A1 | 10/2018 | Baum et al. | |

FOREIGN PATENT DOCUMENTS

| | | | |
|---|---|---|---|
| CN | 104809501 A | 7/2015 | |
| CN | 105095966 A | 11/2015 | |
| CN | 105095967 A | 11/2015 | |
| CN | 105488565 A | 4/2016 | |
| CN | 105913119 A | 8/2016 | |
| CN | 106030622 A | 10/2016 | |
| CN | 108364066 A | 8/2018 | |
| CN | 108427584 A | 8/2018 | |

OTHER PUBLICATIONS

First Office Action dated Jul. 28, 2020 for application No. CN201910139378.2.
Second Office Action dated May 17, 2021 for application No. CN201910139378.2.
Notification of Grant dated Jun. 16, 2021 for application No. CN201910139378.2.
Minghui Yin, et al. "Current Status and Future of Neuromorphic Devices," National Defense Science and Technology, vol. 37, No. 6, Dec. 31, 2016.
Lei Deng. "Towards the Computational Model and Key Technologies on Heterogeneous Brain-Inspired Computing Platform," Ph.D dissertation submitted to Tsinghua University, Feb. 15, 2019.

* cited by examiner many-core system

BRAIN-LIKE COMPUTING CHIP AND COMPUTING DEVICE

CROSS-REFERENCE TO RELATED APPLICATIONS

The present application is a National Phase Application filed under 35 U.S.C. 371 as a national stage of PCT/CN2020/072260, filed on Jan. 15, 2020, an application claiming priority from Chinese Patent Application No. 20190139378.2, filed on Feb. 25, 2019 in the Chinese Intellectual Property Office and titled "BRAIN-LIKE COMPUTING CHIP AND COMPUTING DEVICE", the content of which is hereby incorporated herein by reference in its entirety.

TECHNICAL FIELD

The present disclosure relates to the technical field of chips, in particular, to a brain-like computing chip and a computing device.

BACKGROUND

At present, artificial neuron models are divided into various types according to the fineness of simulated biological neurons and their emphases, such as the most typical Integrate and Fire (IF) model, Leaky Integrate-and-Fire (LIF) model and Izhikevich model. Conventional brain-like chips (neuromorphic chips) take merely one or two of the models into consideration, and are implemented only by means of application-specific integrated chips (ASICs). Although high in execution efficiency and low in power consumption, most of the conventional brain-like chips has poor programmability and cannot support more models. Programmable neuromorphic chips equipped with many-core processors are conventionally adopted, with each core being a general-purpose advanced RISC machine (ARM) processor, but those chips are low in computational efficiency due to a lack of an additional acceleration module for multiplication and addition.

SUMMARY

In view of the above problem, the present disclosure provides a brain-like computing chip and a computing device, which overcome the above problem or at least partially solve the above problem.

In one aspect of the present disclosure, a brain-like computing chip is provided, and the brain-like computing chip is a many-core system composed of one or more functional cores, and data transmission is performed between the functional cores by means of a network-on-chip. The functional core includes: at least one programmable neuron processor configured to compute various neuron models; at least one coprocessor coupled to the neuron processor and configured to perform an integral operation and/or a multiply-add-type operation. The neuron processor is capable of calling the coprocessor to perform the multiply-add-type operation.

Optionally, a specific process of performing the integral operation by the coprocessor is: performing an energy integration operation between a set of input axons and cell bodies of a set of neurons in a neuron model, and a process of the energy integration operation is represented as:

$$Y=WX;$$

where X represents a set of synapses; Y represents a set of neurons; and W represents synaptic connection from X to Y Optionally, W is represented as a two-dimensional matrix M×N, W involves M×N multiply-add-type operations; and the coprocessor is further configured to at least partially complete the M×N multiply-add-type operations in parallel.

Optionally, the multiply-add-type operation includes at least one of vector-matrix multiplication, vector-matrix addition, vector addition, vector summation, dot product of vectors, vector multiplication and matrix-matrix multiplication.

Optionally, the neuron processor is further configured to transmit a specified computation parameter and/or a computation data source to the coprocessor; and the coprocessor is further configured to perform a corresponding data operation based on the specified computation parameter and/or the computation data source transmitted by the neuron processor and send a notification to the neuron processor after the data operation is at least partially completed, so as to allow the neuron processor to perform the other operations after receiving the notification.

Optionally, the neuron processor is further configured to run other operation programs in parallel with the coprocessor when the coprocessor performs the multiply-add-type operation.

Optionally, the brain-like computing chip further includes: a memory array including at least one memory coupled to the neuron processor and/or the coprocessor. The memory is configured to store operation data of the neuron processor and/or the coprocessor, and enable concurrent access by a plurality of the neuron processors and/or the coprocessors in a preset manner.

Optionally, the neuron processor and the coprocessor share at least one memory, and exchange data by means of the memory.

Optionally, the brain-like computing chip further includes: a routing transceiver coupled to the neuron processor and the coprocessor and configured to perform signal transmission between the neuron processor and the coprocessor.

Optionally, the neuron models include a Spiking Neural Network (SNN) model.

In another aspect of the present disclosure, a computing device is further provided and includes the above brain-like computing chip.

Optionally, the computing device further includes: a storage device configured to store a computer program, which is loaded and executed by the brain-like computing chip when running on the computing device.

The present disclosure provides a new brain-like computing chip and a computing device, which adopts a core structure in which the parallel multiply-add-type coprocessor operates in cooperation with the neuron processor, so that the contradiction between the efficiency and the flexibility of the neuromorphic chip is effectively resolved. Moreover, each core is provided with the parallel multiply-add-type coprocessor with a high computing throughput and the neuron processor with a high flexibility, so that various SNN models can be efficiently computed, and high-precision brain mechanism simulation and high-precision brain-like computing can be realized.

In view of a fact that most mainstream neuron models need large-computation-amount multiply-add-type operations for synaptic integration and neuron update and activation models are highly flexible due to various models, the present disclosure provides the processor with a high programmability and the many-core system structure, thereby enabling large-scale parallel neuron computing.

The above description is only a summary of the technical solutions of the present disclosure. In order to enable those of ordinary skill in the art to understand the technical means of the present disclosure clearer and implement the present disclosure according to the content of the description, and to make the above and other objectives, features and advantages of the present disclosure more obvious and intelligible, specific implementations of the present disclosure are described below.

According to the following detailed description of the specific embodiments of the present disclosure in conjunction with the drawings, those of ordinary skill in the art can better understand the above and other objectives, advantages and features of the present disclosure.

BRIEF DESCRIPTION OF THE DRAWINGS

Various additional advantages and benefits will become apparent to those of ordinary skill in the art upon reading the following detailed description of the preferred embodiments. The drawings are merely intended to illustrate the preferred embodiments, and should not be considered as the limitations on the present disclosure. The same reference numerals are used to refer to the same components throughout the drawings. In the drawings.

DETAILED DESCRIPTION

The exemplary embodiments of the present disclosure will be described in detail below with reference to the drawings. Although the drawings show the exemplary embodiments of the present disclosure, it should be understood that the present disclosure may be implemented in various forms and should not be limited to the embodiments described herein. On the contrary, the embodiments are provided to facilitate thorough understanding of the present disclosure and fully convey the scope of the present disclosure to those of ordinary skill in the art.

A brain-like computing chip is a hardware device having a basic function of simulating biological spiking neural networks, and is regarded as a core driving force of computation for the next generation of artificial intelligence. When implemented, most of the conventional neuromorphic chips only take a simpler LIF model, which is characterized in low computational complexity, into consideration, but the chips designed according to the algorithm of the LIF model cannot be used for the computation of other models, and thus can be called single-model neuromorphic chips. The other kind of chips belongs to a general-purpose mathematical computation chip, is provided with a fine-grained execution unit and has scheduling capability, but is not specially optimized for a neuromorphic algorithm. Therefore, neither of the above two kinds of chips can be taken as the brain-like chips capable of being used for a rich SNN model. In addition, the neuromorphic models have not been completely determined and are still developing, and the compatibility of the chips is challenged by unknown algorithms.

Figure 1:
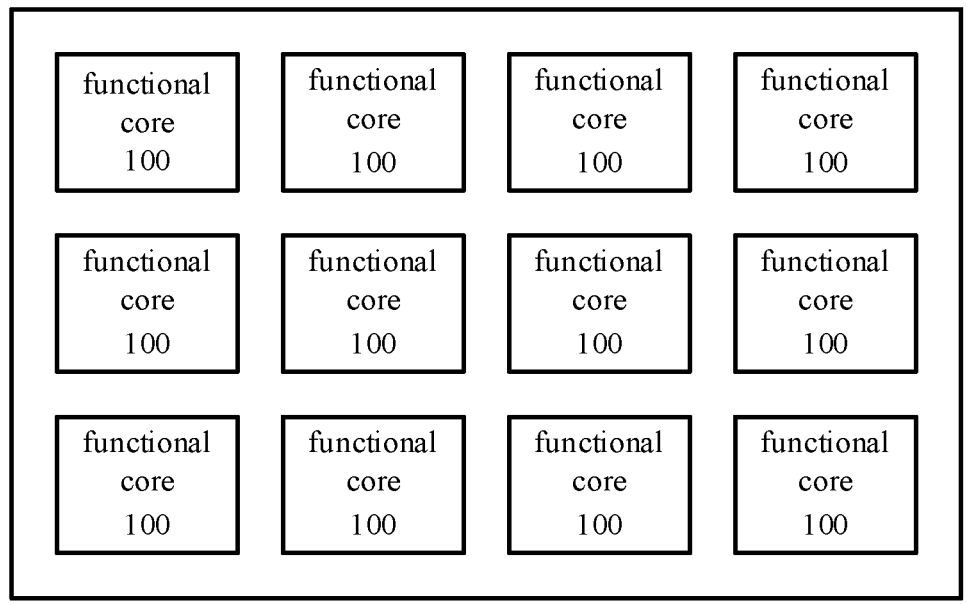
FIG. 1 is a schematic structural diagram of a many-core system according to an embodiment of the present disclosure.

An embodiment of the present disclosure provides a new brain-like computing chip. As shown in FIG. 1, the brain-like computing chip provided by the embodiment of the present disclosure may be a many-core system composed of one or more functional cores 100, and data transmission may be performed between the functional cores 100 by means of a network-on-chip.

Figure 2:
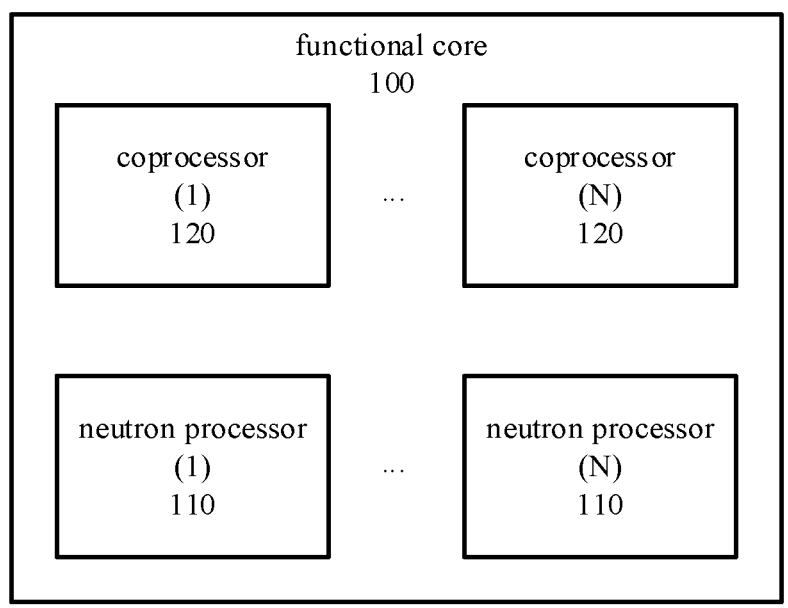
FIG. 2 is a schematic structural diagram of a functional core according to an embodiment of the present disclosure.

As shown in FIG. 2, the functional core 100 provided by the embodiment of the present disclosure may include at least one neuron processor 110 configured to compute various neuron models, such as IF (Integrate and Fire) model, McCulloch and Pitts (M-P) model, Hodgkin-Huxley model, Perceptron model, Fitzhugh-Nagumo model, LIF (Leaky Integrate-and-Fire) model, Morris-Lecar model, Quadratic Integrate-and-Fire model, Time-varying Integrate-and-Fire model, Wilson Polynomial, Integrate-and-Fire or burst model, Resonate-and-Fire model, Izhikevich model, Exponential Integrate-and-Fire model, Generalized Integrate-and-Fire model, Adaptive Exponential Integrate-and-Fire model, Mihalas-Niebur model and so on. The above neuron models are common neuron models, and other neuron models may also be included in practical applications.

A neuron model in the embodiment of the present disclosure is preferably an SNN model.

The SNN is often considered as the $3^{rd}$ generation artificial neural network, and can simulate neurons in a way closer to a biological brain. Due to the bionic characteristic, the SNN has various model algorithms from a coarse granularity to a fine granularity. In addition, the SNN has various time domain coding modes, such as Unary Coding, Burst Coding, Rate Coding, Temporal Coding, Spatial-temporal Coding, Population Coding and so on, which further reflects the richness of the model.

The neuron processor 110 in the embodiment of the present disclosure may have two characteristics. Firstly, the neuron processor 110 is a Turing complete processor, has an instruction set equivalent to a completeness of a general-purpose computer, and can write programs for neuron computation, that is, the neuron processor 110 is programmable. Secondly, the neuron processor 110 may be a processor customized and optimized according to an SNN model. Different from a Graphics Processing Unit (GPU), a Digital Signal Processor (DSP), an x86 Central Processing Unit (x86 CPU) and other general-purpose processors, the neuron processor 110 may be subjected to instruction optimization according to computational characteristics of the SNN model to obtain special neuron processing instructions.

As shown in FIG. 2, the functional core 100 provided by the embodiment of the present disclosure may further include at least one coprocessor 120 coupled to the neuron processor 110 and configured to perform an integral operation and/or a multiply-add-type operation. In practical applications, the neuron processor 110 and the coprocessor 120 may be connected to each other via an in-core bus or a memory interface circuit, and can share a memory in a bus mode.

Optionally, the coprocessor 120 in the embodiment of the present disclosure is a parallel multiply-add-type coprocessor, and can perform an energy integration operation between a set of input axons and cell bodies of a set of neurons in any one neuron model when performing the integral operation. In an SNN model, a branching structure attached to a cell membrane is called dendrite and functions as inputting, and a long tail-like structure is called axon and functions as outputting. What a neuron outputs is an electrical signal and a chemical signal, but most importantly, the neuron outputs a spike that propagates along the membrane surface of the axon. Both the dendrite and the axon have a large number of branches. A terminal of the axon is generally connected to dendrites of other cells, and a structure at the connection point is called synapse, through which an output from one neuron is transmitted to thousands of downstream neurons. One neuron is connected to thousands of upstream neurons and accumulates the inputs therefrom to generate an output.

Optionally, a process of the energy integration operation between a set of input axons to cell bodies of a set of neurons is represented as:

$$Y=WX,$$

where X represents a set of synapses; Y represents a set of neurons; and W represents synaptic connection from X to Y. In addition, the set of synapses represented by X is a one-dimensional vector, and the set of neurons represented by Y is also a one-dimensional vector. W is represented as a two-dimensional matrix M×N, W involves M×N multiply-add-type operations, and the coprocessor 120 can be further configured to at least partially complete the M×N multiply-add-type operations in parallel. Due to the large computation amount, the above process cannot be efficiently completed by the neuron processor. Therefore, the embodiment sets forth adopting the parallel multiply-add-type coprocessor to complete the process, thereby further increasing the computational efficiency. M and N are both integers greater than 1 and may be specifically set according to different situations, but the setting of M and N is not limited by the present disclosure.

As mentioned above, the coprocessor 120 may also be configured to perform the multiply-add-type operation, which may include at least one of vector-matrix multiplication, vector-matrix addition, vector addition, vector summation, dot product of vectors, vector multiplication and matrix-matrix multiplication. In addition to the above operations, the coprocessor 120 may also perform other operations which are not limited by the present disclosure. The above multiply-add-type operations multiplex a multiply-add-type coprocessor array, which interacts with the neuron processor 110 by means of a call instruction for the coprocessor 120 set in the neuron processor 110.

When the neuron processor 110 interacts with the coprocessor 120, the neuron processor 110 may call the coprocessor 120 to perform the multiply-add-type operation. Specifically, a calling process may include transmitting a specified computation parameter and a computation data source to the coprocessor 120, or the calling may be implemented by using precompiled codes. That is, the neuron processor 110 may be further configured to transmit a specified computation parameter and/or a computation data source to the coprocessor 120, the coprocessor 120 may be further configured to perform a corresponding data operation based on the specified computation parameter and/or the computation data source transmitted by the neuron processor 110 and send a notification to the neuron processor 110 after the data operation is at least partially completed, so that the neuron processor 110 may perform the other operations after receiving the notification. Optionally, the neuron processor 110 may be further configured to run other operation programs, such as scheduling and calculation programs other than the multiply-add-type operation, in parallel with the coprocessor 120 when the coprocessor 120 performs the multiply-add-type operation. When the neuron processor 110 transmits the specified computation parameter and/or the computation data source to the coprocessor 120, the transmission may be carried out in advance or when the neuron processor 110 calls the coprocessor 120 to perform the multiply-add-type operation, which is not limited by the present disclosure.

Figure 3:
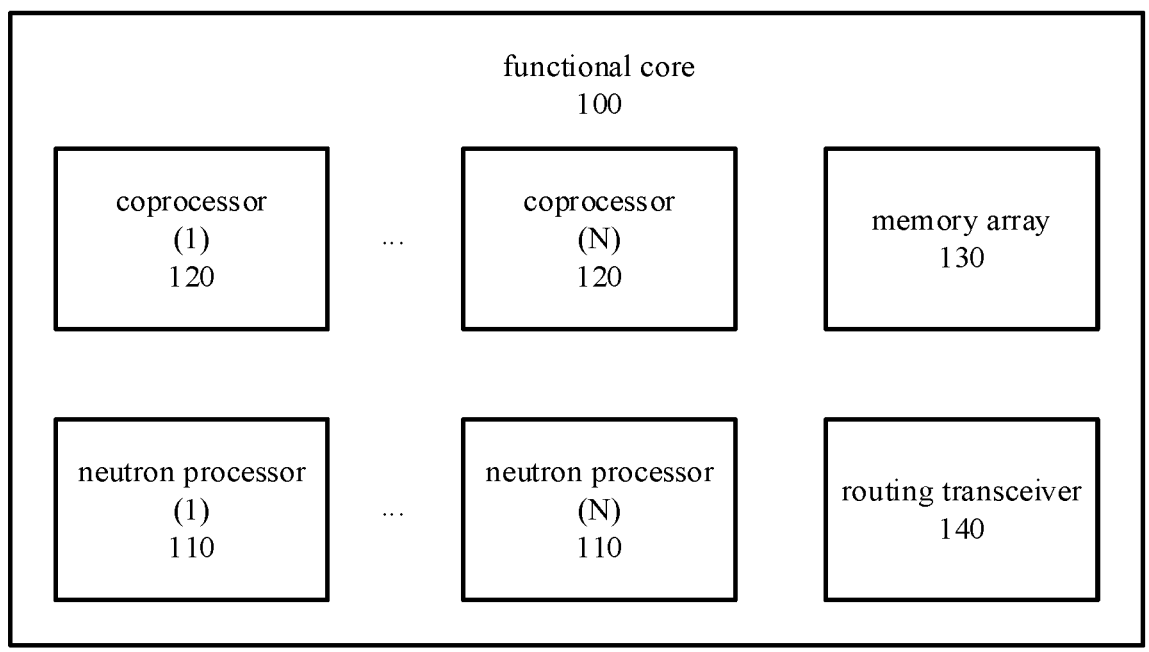
FIG. 3 is a schematic structural diagram of a functional core according to another embodiment of the present disclosure.

FIG. 3 is a schematic structural diagram of a functional core according to another embodiment of the present disclosure. As shown in FIG. 3, the functional core 100 provided by another embodiment of the present disclosure may further include a memory array 130 including at least one memory coupled to the neuron processor 110 and/or the coprocessor 120. The memory is configured to store operation data of the neuron processor 110 and/or the coprocessor 120, and enable concurrent access by a plurality of the neuron processors 110 and/or the coprocessors 120 in a preset manner. The neuron processor 110 and the coprocessor 120 share at least one memory 130, and exchange data by means of the memory 130. The preset manner may be load balancing or other manners, and is not limited by the present disclosure.

That is to say, according to the embodiment, the exchange of a large amount of data between the neuron processor 110 and the coprocessor 120 is carried out by using the shared memory, and the shared memory enables the concurrent access by a plurality of the neuron processors 110 and the coprocessors 120 by means of arbitration. For example, when the coprocessor 120 and the neuron processor 110 access the memory concurrently, the memory responds to the coprocessor 120 first and suspends the neuron processor 110, and responds to the neuron processor 110 until the coprocessor 120 does not access the memory. When a plurality of the coprocessors 120 access the memory concurrently, the memory numbers the coprocessors 120 and responds to the coprocessor 120 given the smallest number.

As shown in FIG. 3, the functional core 100 provided by another embodiment of the present disclosure may further include a routing transceiver 140 coupled to the neuron processor 110 and the coprocessor 120 and configured to perform signal transmission between the neuron processor 110 and the coprocessor 120. Other control signals, such as a start signal and a status acquisition signal, may be transmitted between the coprocessor 120 and the neuron processor 110.

In addition to the above description, the brain-like computing chip provided by the embodiments of the present disclosure may also be applied to the computation of neural networks other than the SNN, graph computing, and devices such as a high-speed routing switch.

Several specific embodiments are described below to illustrate how to perform model computation with the neuron processor and the parallel multiply-add-type coprocessor.

Embodiment One: Leaky Integrate and Fire (LIF) Model

1. Update of a membrane potential value of a neutron: a membrane potential value $V_1(t)$ of an LIF spiking neutron is updated at the moment t, and the membrane potential value $V_1(t)$ at the moment t can be represented as a sum of a dot product of an axon input $X(t)$ and a synaptic weight $W_1$ and a value obtained by subjecting a membrane potential value $V_{1rst}(t)$ maintained by the neutron at the last moment to an action of a membrane potential attenuation coefficient α, as shown in the following formula:

$$V_1(t)=X(t)\cdot W_1+\alpha V_{1rst}(t-1) \quad \text{Formula (1)}$$

2. Determination of an output from a neutron: an output of the LIF spiking neuron is represented by 0 or 1, which indicates an absence of a spike or a presence of a spike; an output spike $y_1(t)$ is determined by comparing a sum of the membrane potential value $V_1(t)$ at the moment t and a bias b (also called a Changzhi attenuation) with a neuron threshold $V_{th}$, $y_1(t)$ is 1 when the biased membrane potential value is greater than or equal to the neuron threshold $V_{th}$, and $y_1(t)$ is 0 when the biased membrane potential value is less than the neuron threshold $V_{th}$, as shown in the following formula:

$$y_1(t) = \text{argmax}(V_{th}, V_1(t)+b) \quad \text{Formula (2)}$$

3. Resetting of a neuron membrane potential: when the LIF spiking neuron outputs a spike, that is, $y_1(t)$ is 1, the neuron membrane potential is required to be reset in such a way that a product of a value of reset constant β and the output spike $y_1(t)$ is subtracted from the current membrane potential value $V_1(t)$ of the neuron to obtain a reset neuron membrane potential $V_{1rst}(t)$ of the neuron, as shown in the following formula:

$$V_{1rst}(t) = V_1(t) - \beta y_1(t) \quad \text{Formula (3)}$$

Where y=argmax(a, b) is defined as: when b>a, y=1; otherwise, y=0.

In the embodiment, the multiply-add-type coprocessor array has the following functions:

vector-matrix multiplication instruction: vector=vec_mat_mul(matrix, vector)

vector dot multiplication: vector=vec_mul(vector1, vector2)

vector addition: vector=vec_add(vector1, vector2)

vector subtraction: vector=vec_sub(vector1, vector2)

The neuron processor implements the argmax function.

The above LIF process can be expressed as the following codes:

router_read(X)
$I_1$=vec_mat_mul($W_1$, X) // efficiently implemented by the coprocessor
$I_2$=vec_mul(α, $V_1$) // efficiently implemented by the coprocessor
$V_1$=vec_add($I_1$, $I_2$) // efficiently implemented by the coprocessor
$V_2$=vec_add($V_1$, b) // efficiently implemented by the coprocessor
$y_1$=argmax($V_{th}$, $V_2$)
$y_2$=vec_mul($y_1$, β) // efficiently implemented by the coprocessor
$V_1$=vec_sub($V_1$, $y_2$) // efficiently implemented by the coprocessor
router_send($V_1$) // efficiently implemented by the coprocessor Where vec_mat_mul, vec_mul, vec_add and vec_sub are calculated by the multiply-add-type coprocessor array, and the other operations such as argmax and a computation process are processed by the neuron processor through programming.

The codes are stored in the neuron processor, and the neuron processor calls the multiply-add-type coprocessor to complete corresponding functions. For a function which cannot be performed by the multiply-add-type coprocessor, such as argmax, it is implemented by software code of the neuron processor.

Embodiment Two: Izhikevich Model

The update of a membrane potential of a neuron is expressed by a differential equation in the Izhikevich model.

As shown in the following formulae, v represents a membrane potential of an Izhikevich neuron, u is a recovery variable and is used to describe activities of $Na^+$ and $K^+$ in a biological neutron, and I represents an input stimulation to a neuron, and the input stimulation is, similar to the Embodiment One, obtained by a dot product of an axon input X and a synaptic weight W.

Formula (4) represents that a change of the membrane potential v of a neuron with the time is decided by the membrane potential of the neuron together with a current recovery variable u and the input stimulation I. Formula (5) represents a change of the recovery variable u with the time is decided by the recovery variable u together with a current membrane potential v of the neuron. Formula (6) illustrates a logic of a determination of an output of the neuron and resetting and updating of the membrane potential of the neuron and the recovery variable: when the membrane potential v of the neuron is greater than a threshold $v_{th}$, the neuron outputs a spike (similar to $y_1(t)$ in the Embodiment One, 0 and 1 are used to indicate an absence of an output spike and a presence of an output spike, respectively), and simultaneously the values of the membrane potential v and the recovery variable u are updated. In the formulaes, a, b, c and d represent different neutron parameters. Furthermore, the constants (0.04, 5, 140) in the Formula (4) in the embodiment can be set to other values when the Formula (4) is efficiently implemented by the coprocessor, so as to realize flexible update of the membrane potential.

$$\frac{dv}{dt} = 0.04v^2 + 5v + 140 - u + I \quad \text{Formula (4)}$$

$$\frac{du}{dt} = a*(bv - u) \quad \text{Formula (5)}$$

$$\text{if } v > v_{th}, \text{ spike } \& v = c \ \& u = u + d \quad \text{Formula (6)}$$

The corresponding implementation codes are as follows:

// the following codes are configured to calculate $$\frac{dv}{dt} = 0.04v^2 + 5v + 140 - u + I$$

```
un = vec_sub(0, u) // efficiently implemented by the coprocessor
v₁ = vec_add(un, input) // efficiently implemented by the coprocessor
v₁ = vec_add(v₁, 140) // efficiently implemented by the coprocessor
v₂ = vec_mul(5, v) // efficiently implemented by the coprocessor
v₁ = vec_add(v₁, v₂) // efficiently implemented by the coprocessor
v₂ = vec_mul(v, v) // efficiently implemented by the coprocessor
v₂ = vec_mul(v₂, 0.04) // efficiently implemented by the coprocessor
v₁ = vec_add(v₁, v₂) // efficiently implemented by the coprocessor
v = vec_add(v₁, v) // efficiently implemented by the coprocessor
// the following codes are configured to calculate
```

$$\frac{du}{dt} = a*(bv - u), \text{ if } v > v_{th}, \text{ spike } \& v = c \ \& u = u + d$$

```
v₁ = vec_mul(b, v) // efficiently implemented by the coprocessor
v₁ = vec_sub(v₁, u) // efficiently implemented by the coprocessor
u₁ = vec_mul(v₁, a) // efficiently implemented by the coprocessor
u₁ = vec_add(u₁, u) // efficiently implemented by the coprocessor
u₂ = vec_mul(para₁, v) // efficiently implemented by the coprocessor
u = vec_sub(u₂, u₁) // efficiently implemented by the coprocessor
s = argmax(v_{th}, v)
v = sel(s, c, v)
```

-continued

```
ud = vec_add(u, d) // efficiently implemented by the coprocessor
u = sel(s, ud, u)
the execution of y = sel(c, a, b) is that: when c = 1, y = a; otherwise,
y = b.
```

It can be seen from the above that various neuron models such as the LIF model and the Izhikevich model can be effectively executed by the neutron processor calling the multiply-add-type coprocessor, with high efficiency and good flexibility realized.

Based on the same inventive concept, an embodiment of the present disclosure further provides a computing device, including the brain-like computing chip described in any one of the above embodiments.

In an optional embodiment of the present disclosure, the computing device further includes: a storage device configured to store a computer program, which is loaded and executed by the brain-like computing chip when running on the computing device.

The brain-like computing chip provided by the embodiments of the present disclosure is configured to efficiently implement various neuromorphic algorithms, and particularly for computational characteristics of rich SNN models, implement synaptic computation with a high computing density and cell body computation requiring a high flexibility, so as to realize optimization of brain-like computing of the rich SNN models. In addition, a core structure in which the parallel multiply-add-type coprocessor operates in cooperation with the neuron processor is adopted, so that the contradiction between the efficiency and the flexibility of the neuromorphic chip is effectively resolved. Moreover, each core is provided with the parallel multiply-add-type coprocessor with a high computing throughput and the neuron processor with a high flexibility, so that various SNN models can be efficiently computed, and high-precision brain mechanism simulation and high-precision brain-like computing can be realized.

In view of a fact that most mainstream neuron models need large-computation-amount multiply-add-type operations for synaptic integration and neuron update and activation models are highly flexible due to various models, the present disclosure provides the processor with a high programmability and the many-core system structure, thereby enabling large-scale parallel neuron computing.

The description herein provides a lot of details. However, it should be understood that the embodiments of the present disclosure can be enabled without those details. In some examples, well-known methods, structures and techniques are not illustrated in detail for avoiding obscuring an understanding of the description.

Similarly, it should be understood that, in order to simplify the present disclosure and help understand one or more aspects of the present disclosure, the features of the present disclosure are sometimes grouped together in a single embodiment, drawing, or description thereof in the above description of the exemplary embodiments of the present disclosure. However, the method of the present disclosure should not be interpreted as reflecting the intention that the claimed disclosure requires more features than those explicitly recorded in each claim. More precisely, as reflected in the following claims, a disclosed aspect is less than all the features of the previously disclosed single embodiment. Therefore, the claims according to the detailed description hereby are explicitly incorporated into the detailed description, with each claim itself being regarded as a single embodiment of the present disclosure.

It should be understood by those of ordinary skill in the art that the modules in the devices in the embodiments may be adaptively changed and arranged in one or more devices different from those disclosed in the embodiments. The modules or units or components in the embodiments may be combined into one module or unit or component, and may also be divided into a plurality of sub-modules or sub-units or sub-components. Except that at least some of the features and/or processes or units are mutually exclusive, all the features disclosed in the specification (including the claims, abstract and drawings) and all the processes or units of any method or device such disclosed may be combined in any way. Unless expressly stated otherwise, each feature disclosed in the specification (including the claims, abstract and drawings) may be replaced with an alternative feature capable of achieving the same, equivalent or similar objective.

Moreover, it should be understood by those of ordinary skill in the art that, although some embodiments described herein include some features, but not other features, included in other embodiments, the combinations of the features of different embodiments are intended to fall within the scope of the present disclosure and form different embodiments. For example, any one of the claimed embodiments in the claims may be implemented in the form of a combination.

It should be noted that the above embodiments are intended to illustrate but not limit the present disclosure and those of ordinary skill in the art can design alternative embodiments without departing from the scope of the appended claims. In the claims, none of the reference numerals placed between parentheses shall be considered as limitations on the claims. The term "comprising" does not exclude the existence of elements or steps which are not listed in the claims. The term "a" or "one" before an element does not exclude the existence of a plurality of such elements. The present disclosure can be implemented by means of hardware including several different elements and by means of a properly programmed computer. In the unit claims listing a plurality of devices, several of those devices can be specifically implemented by one same hardware item. The terms "first", "second" and "third" used herein do not indicate any sequence, and may be interpreted as names.

Thus, it should be understood by those of ordinary skill in the art that, although a plurality of exemplary embodiments of the present disclosure have been illustrated and described in detail herein, many other variations or modifications which are consistent with the principle of the present disclosure can be directly determined or be derived from the content disclosed herein without departing from the spirit and scope of the present disclosure. Therefore, it should be such understood and determined that the scope of the present disclosure includes all of those variations or modifications.

What is claimed is:

1. A brain-like computing chip, being a many-core system composed of one or more functional cores, wherein data transmission is performed between the functional cores by means of a network-on-chip;

the functional core comprises:
at least one programmable neuron processor configured to compute various neuron models; and
at least one coprocessor coupled to the neuron processor and configured to perform an integral operation and/or a multiply-add-type operation;

wherein the neuron processor is capable of calling the coprocessor to perform the multiply-add-type operation, wherein a specific process of performing the integral operation by the coprocessor is: performing an energy integration operation between a set of input axons and cell bodies of a set of neurons in a neuron model, and a process of the energy integration operation is represented as:

$$Y=WX;$$

wherein X represents a set of synapses; Y represents a set of neurons; and W represents synaptic connection from X to Y.

2. The brain-like computing chip of claim 1, wherein W is represented as a two-dimensional matrix M×N, W involves M×N multiply-add-type operations; and the coprocessor is further configured to at least partially complete the M×N multiply-add-type operations in parallel.

3. The brain-like computing chip of claim 1, wherein the multiply-add-type operation comprises at least one of vector-matrix multiplication, vector-matrix addition, vector addition, vector summation, dot product of vectors, vector multiplication and matrix-matrix multiplication.

4. The brain-like computing chip of claim 1, wherein the neuron processor is further configured to transmit a specified computation parameter and/or a computation data source to the coprocessor; and the coprocessor is further configured to perform a corresponding data operation based on the specified computation parameter and/or the computation data source transmitted by the neuron processor and send a notification to the neuron processor after the data operation is at least partially completed, so as to allow the neuron processor to perform the other operations after receiving the notification.

5. The brain-like computing chip of claim 4, wherein the neuron processor is further configured to run other operation programs in parallel with the coprocessor when the coprocessor performs the multiply-add-type operation.

6. The brain-like computing chip of claim 1, wherein the functional core further comprises:

a memory array comprising at least one memory coupled to the neuron processor and/or the coprocessor, wherein the memory is configured to store operation data of the neuron processor and/or the coprocessor, and enable concurrent access by a plurality of the neuron processors and/or the coprocessors in a preset manner.

7. The brain-like computing chip of claim 6, wherein the neuron processor and the coprocessor share at least one memory, and exchange data by means of the memory.

8. The brain-like computing chip of claim 6, wherein the functional core further comprises:

a routing transceiver coupled to the neuron processor and the coprocessor and configured to perform signal transmission between the neuron processor and the coprocessor.

9. A computing device, comprising the brain-like computing chip of claim 1.

* * * * *